US011101871B1

(12) United States Patent
Karakkad Kesavan Namboodiri et al.

(10) Patent No.: US 11,101,871 B1
(45) Date of Patent: Aug. 24, 2021

(54) BEAM SELECTION FOR MULTI-SUBSCRIBER IDENTITY MODULE (MSIM) DEVICES

(71) Applicant: QUALCOMM Incorporated, San Diego, CA (US)

(72) Inventors: Vishnu Namboodiri Karakkad Kesavan Namboodiri, Hyderabad (IN); Sandeep Kumar Aitha, San Diego, CA (US); Arnab Pal, Kolkata (IN); Mohammad Ashraf, Cuttack (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/786,677

(22) Filed: Feb. 10, 2020

(51) Int. Cl.
H04W 4/60 (2018.01)
H04B 7/08 (2006.01)
H04W 16/28 (2009.01)
H04W 68/00 (2009.01)
H04W 8/18 (2009.01)
H04W 24/10 (2009.01)

(52) U.S. Cl.
CPC ............ *H04B 7/088* (2013.01); *H04W 8/183* (2013.01); *H04W 16/28* (2013.01); *H04W 24/10* (2013.01); *H04W 68/005* (2013.01)

(58) Field of Classification Search
CPC ......... H04W 4/60; H04W 8/24; H04W 24/10; H04W 56/001; H04W 68/005; H04W 48/16; H04W 48/18; H04W 36/0088; H04W 88/06; H04W 72/1215; H04W 60/005; H04W 16/28; H04W 8/183; H04B 7/088
See application file for complete search history.

(56) References Cited

U.S. PATENT DOCUMENTS

2015/0289314 A1* 10/2015 Yang ................. H04W 56/0045
455/552.1
2015/0350934 A1 12/2015 Yang et al.
2019/0349960 A1* 11/2019 Li ..................... H04W 72/1242

OTHER PUBLICATIONS

International Search Report and Written Opinion—PCT/US2021/012423—ISA/EPO—dated May 11, 2021.

* cited by examiner

*Primary Examiner* — Chuong A Ngo
(74) *Attorney, Agent, or Firm* — Norton Rose Fulbright LLP

(57) ABSTRACT

In a particular implementation, a method of wireless communication includes searching, at a user equipment (UE) having a first subscriber identity module (SIM) and a second SIM, transmit beams from a base station and receive beams from the UE to determine a subset of transmit beams. The method also includes storing indicators of the subset of transmit beams in a database accessible to the UE in response to the second SIM performing a particular operation that causes the first SIM to perform a tune away operation. The method further includes, after completion of the particular operation, performing measurement operations on the subset of transmit beams to select a particular transmit beam of the subset of transmit beams and a corresponding particular receive beam for attachment to the base station.

30 Claims, 7 Drawing Sheets

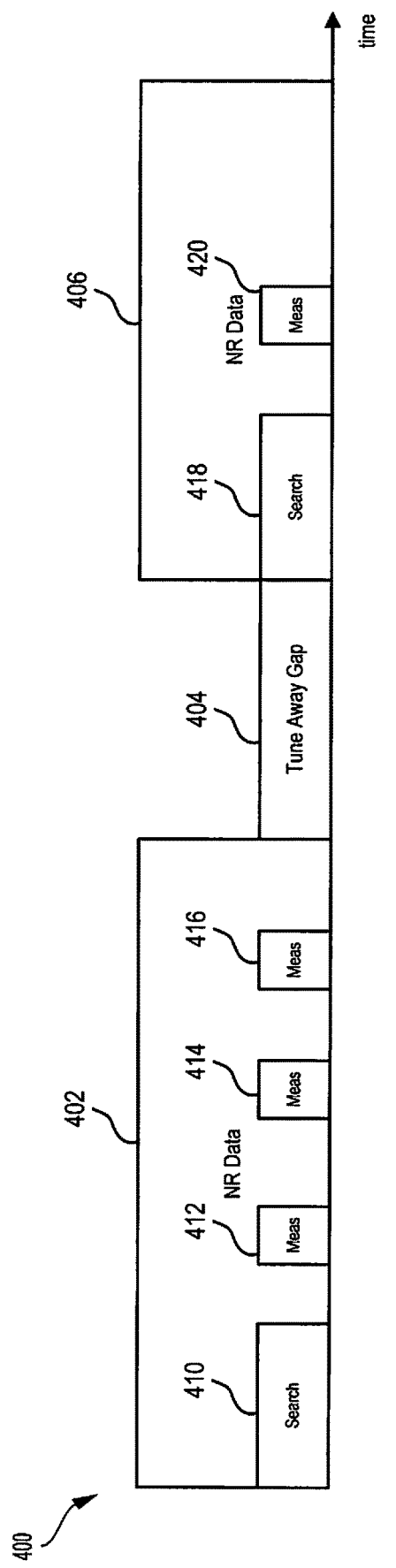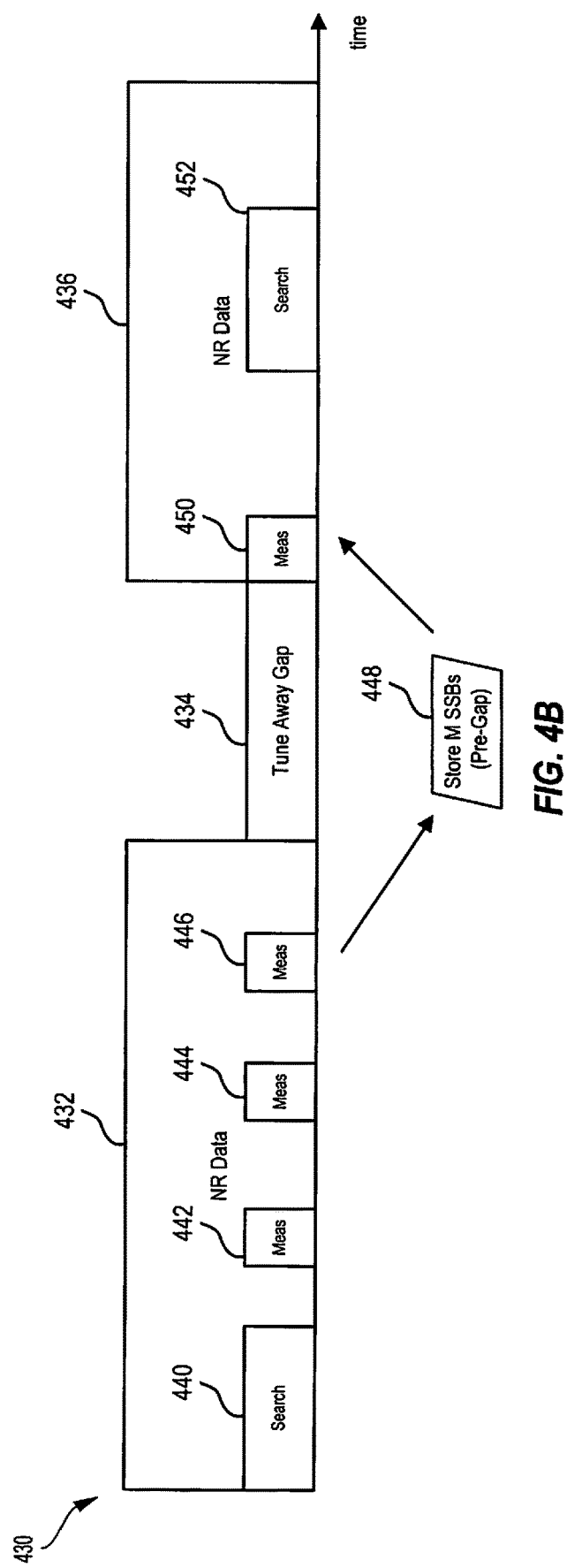

BEAM SELECTION FOR MULTI-SUBSCRIBER IDENTITY MODULE (MSIM) DEVICES

TECHNICAL FIELD

Aspects of the present disclosure relate generally to wireless communication systems, and more particularly, to wireless communication systems including user equipments (UEs) with multiple subscriber identity modules (MSIM). Certain embodiments of the technology discussed below can enable and provide a UE that performs beam measurements after a tune away gap without performing a full search, which may improve connection between the UE and a base station and reduce, or prevent, radio link failure (RLF).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes searching, at a user equipment (UE) having a first subscriber identity module (SIM) and a second SIM, transmit beams from a base station and receive beams from the UE to determine a subset of beams. The method also includes storing indicators of the subset of transmit beams in a database accessible to the UE in response to the second SIM performing a particular operation that causes the first SIM to perform a tune away operation. The method further includes, after completion of the particular operation, performing measurement operations on the subset of transmit beams to select a particular transmit beam of the subset of transmit beams and a corresponding particular receive beam for attachment to the base station.

In an additional aspect of the disclosure, an apparatus configured for wireless communication is disclosed. The apparatus includes at least one processor, and a memory coupled to the at least one processor. The at least one processor is configured to search, at a user equipment (UE) having a first subscriber identity module (SIM) and a second SIM, transmit beams from a base station and receive beams from the UE to determine a subset of transmit beams. The at least one processor is also configured to store indicators of the subset of transmit beams in a database accessible to the UE in response to the second SIM performing a particular operation that causes the first SIM to perform a tune away operation. The at least one processor is further configured to, after completion of the particular operation, perform measurement operations on the subset of transmit beams to select a particular transmit beam of the subset of transmit beams and a corresponding particular receive beam for attachment to the base station.

In an additional aspect of the disclosure, an apparatus configured for wireless communication is disclosed. The apparatus includes means for searching, at a user equipment (UE) having a first subscriber identity module (SIM) and a second SIM, transmit beams from a base station and receive beams from the UE to determine a subset of transmit beams. The apparatus also includes means for storing indicators of the subset of transmit beams in a database accessible to the UE in response to the second SIM performing a particular operation that causes the first SIM to perform a tune away operation. The apparatus further includes means for, after completion of the particular operation, performing measurement operations on the subset of transmit beams to select a particular transmit beam of the subset of transmit beams and a corresponding particular receive beam for attachment to the base station.

In an additional aspect of the disclosure, a non-transitory computer-readable medium stores instructions that, when executed by a processor, causes the processor to perform operations including searching, at a user equipment (UE) having a first subscriber identity module (SIM) and a second SIM, transmit beams from a base station and receive beams from the UE to determine a subset of transmit beams. The operations include storing indicators of the subset of transmit beams in a database accessible to the UE in response to the second SIM performing a particular operation that causes the first SIM to perform a tune away operation. The operations further include, after completion of the particular operation, performing measurement operations on the subset of transmit beams to select a particular transmit beam of the subset of transmit beams and a corresponding particular receive beam for attachment to the base station.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are diagrams of operations performed by a first subscriber identity module (SIM) of a multi-SIM (MSIM) device according to some aspects of the present disclosure.

DETAILED DESCRIPTION

Figure 1:
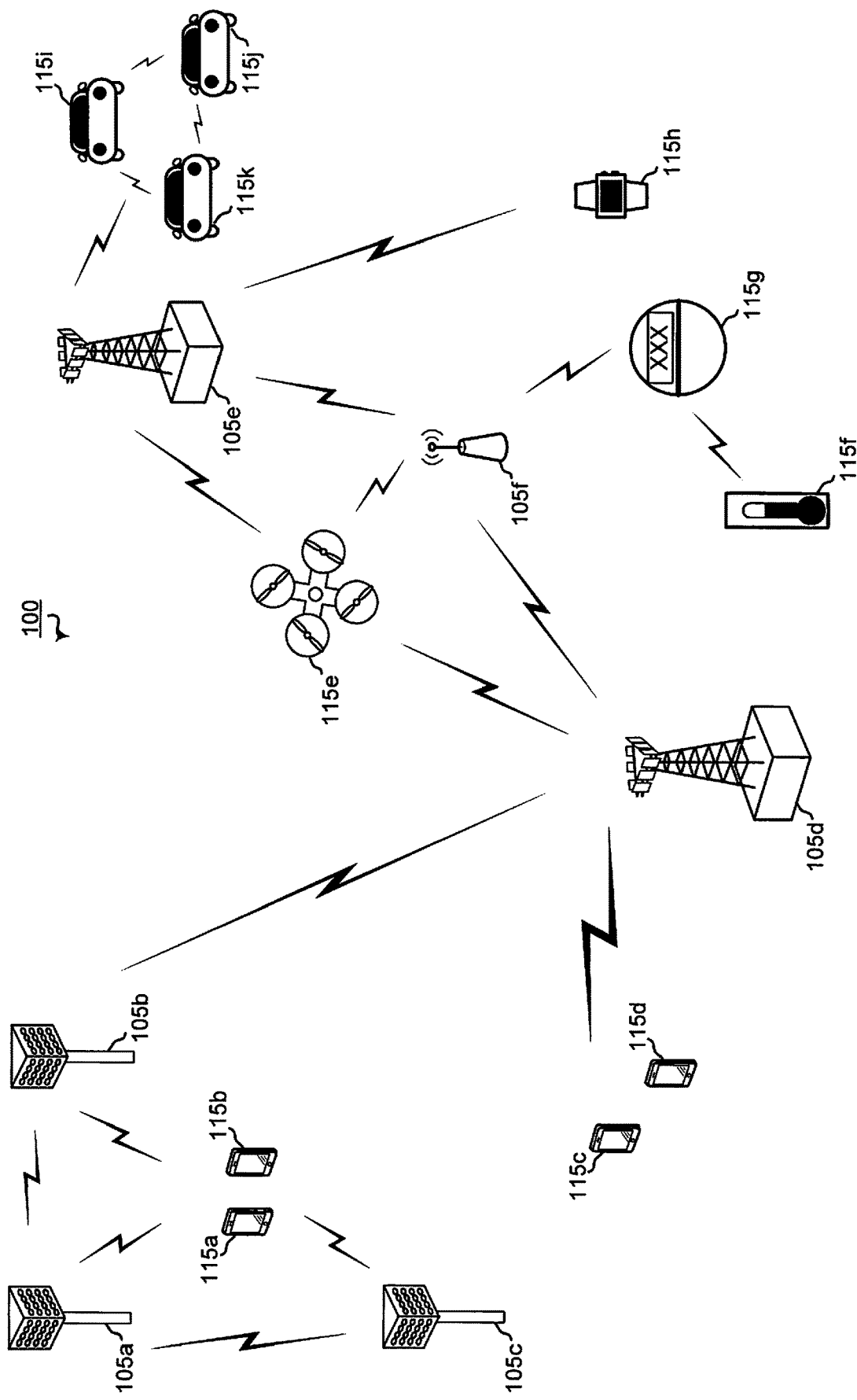
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
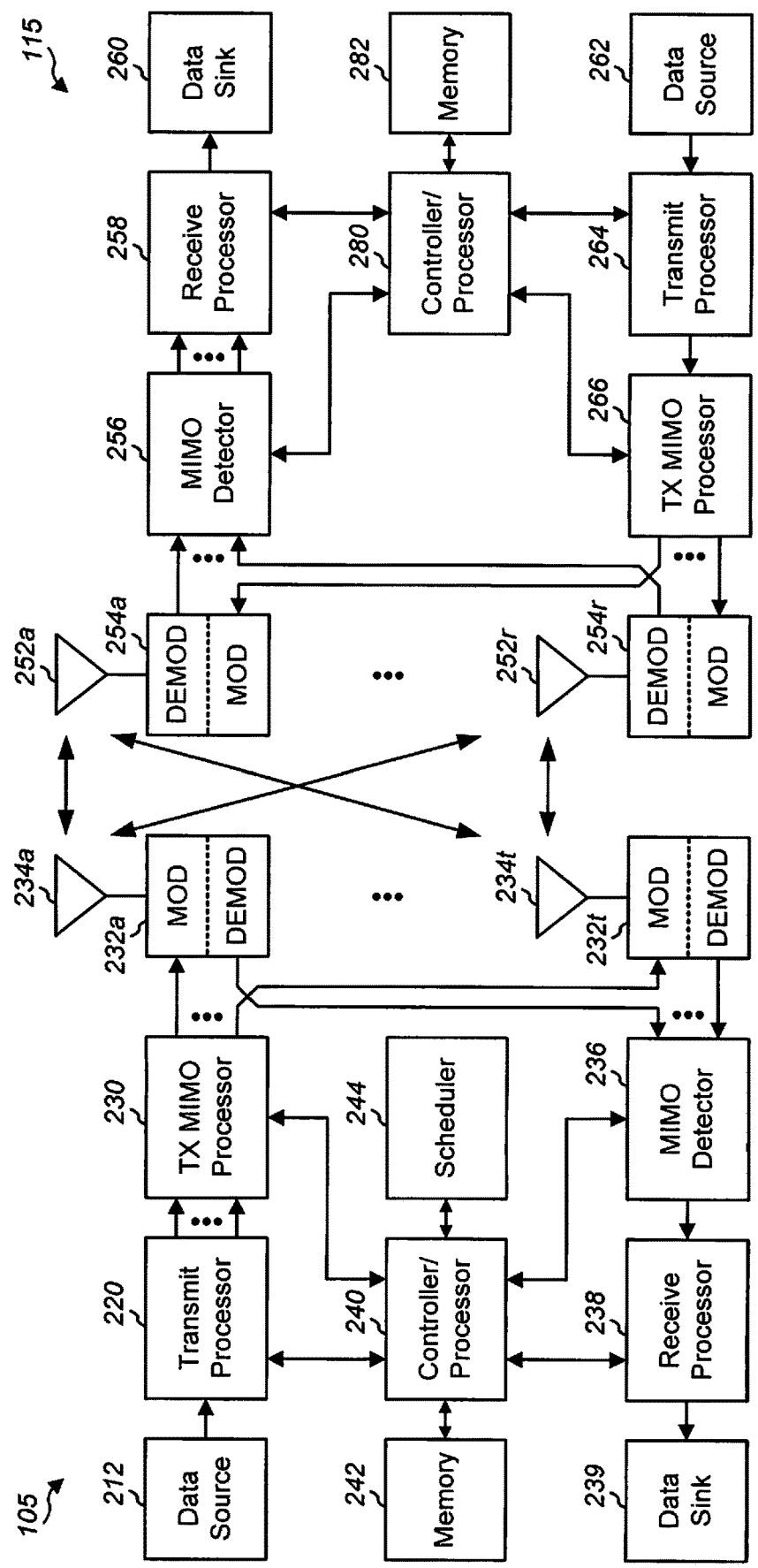
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-6, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Wireless communication devices may include multiple subscriber identity modules (SIMs) to enable communications in accordance with different wireless communication standards. Such devices may be referred to as multi-SIM (MSIM) devices. For MSIM devices, one SIM may control the communication circuitry (e.g., the receiver, the transmitter, the transceiver, etc.) at a time. Control of the communication circuitry may be assigned using any number of schemes, such as priority schemes, round robin schemes, etc. In priority schemes, one SIM has priority over another SIM, and can take control of the communication circuitry from the other SIM. This can cause the other SIM to enter a tune away state, where the other SIM gives up control of the communication circuitry. Such tuning away can cause problems, particular for fifth generation (5G) new radio (NR) SIMs. For example, a 5G NR SIM may be performing a search operation on transmit and receive beams to determine which transmit and receive beam to use to attach to (e.g., associate with) a base station. The search operation is performed to determine a subset of transmit beams to perform measurement operations on to determine the "best" transmit beam (and corresponding receive beam) for associating with the base station. This process may occur periodically, or when a current beam used for communication no longer satisfies a threshold. If this process is interrupted by the higher-priority SIM (e.g., another 5G NR SIM or a long-term evolution LTE SIM, as non-limiting examples) taking control of the communication circuitry, a tuning away period occurs for the 5G NR SIM. After the tuning away period (e.g., when the LTE SIM releases control of the communication circuitry), the 5G NR SIM begins performance of the search operation, followed by the measurement operations. However, the combination of search and measurement operations may take too much time if the currently used beam is degrading in quality, leading to potential radio link failure (RLF) and decreased throughput.

The present disclosure provides apparatus, systems, methods, and computer readable media to reduce, or prevent, the RLF experienced due to tune-away operations caused by a higher-priority SIM (e.g., an LTE SIM, as a non-limiting example) taking control of communication circuitry from a lower-priority SIM, such as a 5G NR SIM. Although described as lower priority, in other implementations, the operation may be higher priority, and the SIMs may have the same priority. In order to compensate for the tune away period, the subset of transmit beams that are determined prior to the tune away period may be stored in a database or other memory and, after the tune away period for the higher-priority SIM to perform an operation (e.g., transmit a paging signal or perform an out of service/acquisition operation), the 5G NR SIM may access the database to quickly identify the subset of transmit beams that were determined to be the best (e.g., that satisfy a quality threshold). After identifying the subset of transmit beams, the UE performs measurement operations on the subset of transmit beams to determine a particular transmit beam (and corresponding particular receive beam) for associating with the base station. In this manner, the UE can determine a particular transmit beam faster (e.g., without performing a time-consuming search operation on all the available transmit and receive beams), which may enable the UE to associate with the base station without suffering RLF due to a degraded beam. Reducing (or eliminating) RLF improves the quality of a call and improves throughput.

Figure 3:
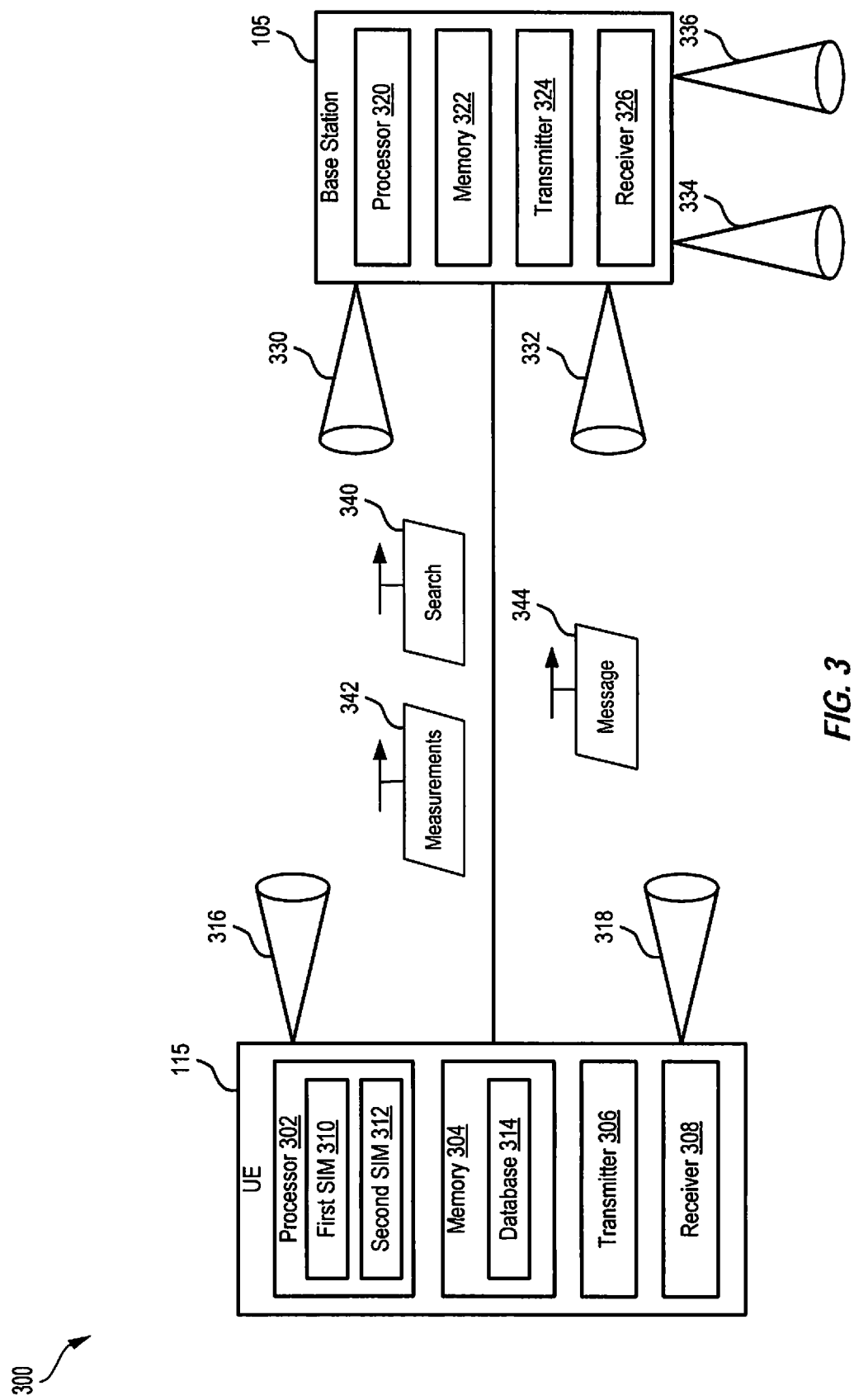
FIG. 3 is a block diagram illustrating details of a wireless communication system configured to store beam indicators according to some aspects of the present disclosure.

FIG. 3 is a block diagram of an example wireless communications system 300 configured to store transmit beam indicators. In some examples, wireless communications system 300 may implement aspects of wireless network 100. For example, wireless communications system 300 may include UE 115 and the base station 105. Although one UE and one base station are illustrated, in other implementations, wireless communications system 300 may include multiple UEs 115, multiple base stations 105, or both.

UE 115 can include a variety of components (e.g., structural, hardware components) used for carrying out one or more functions described herein. For example, these components can include a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282. Processor 302 may include one or more subscriber identity modules (SIMs), such as first SIM 310 and second SIM 312. First SIM 310 and second SIM 312 may correspond to the same or different wireless communication standards. For example, first SIM 310 may correspond to a first wireless communication standard, and second SIM 312 may correspond to a second wireless communication standard. The second wireless communication standard is different from the first wireless communication standard, in some implementations. In other implementations, the second wireless communication standard is the same as the first wireless communication standard. To illustrate, in some implementations, first SIM 310 corresponds to a fifth generation (5G) new radio (NR) SIM, and second SIM 312 corresponds to a 5G NR SIM, a Long-term evolution (LTE) SIM, a wideband code division multiple access (WCDMA) SIM, a Global System for Mobile Communication (GSM) SIM, or any other type of SIM. Although illustrated as part of processor 302, in other implementations, SIMS 310-312 may be separate components or included in memory 304. Memory 304 may be configured to store a database 314 of indicators, as further described herein. Although illustrated as part of memory 304, in other implementations, database 314 may be external to and accessible to UE 115.

Transmitter 306 is configured to transmit data to one or more other devices, and receiver 308 is configured to receive data from one or more other devices. For example, transmitter 306 may transmit data, and receiver 308 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

UE 115 (e.g., receiver 308) may be configured to generate one or more receive (RX) beams, such as illustrative first RX beam 316 and second RX beam 318. RX beams 316-318 may be used to receive data from base station 105, as further described herein.

Base station 105 can include a variety of components (e.g., structural, hardware components) used for carrying out one or more functions described herein. For example, these components can include processor 320, memory 322, transmitter 324, and receiver 326. Processor 320 may be configured to execute instructions stored at memory 322 to perform the operations described herein. In some implementations, processor 320 includes or corresponds to controller/processor 240, and memory 322 includes or corresponds to memory 242.

Transmitter 324 is configured to transmit data to one or more other devices, and receiver 326 is configured to receive data from one or more other devices. For example, transmitter 324 may transmit data, and receiver 326 may receive data, via a network, such as a wired network, a wireless network, or a combination thereof. For example, base station 105 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 324 and receiver 326 may be replaced with a transceiver. Additionally, or alternatively, transmitter 324, receiver, 326, or both may include or correspond to one or more components of base station 105 described with reference to FIG. 2.

Base station 105 (e.g., transmitter 324) may be configured to generate one or more transmit (TX) beams, such as illustrative first TX beam 330, second TX beam 332, third TX beam 334, and fourth TX beam 336. TX beams 330-336 may be used to transmit data to UE 115, as further described herein.

In a particular implementation, wireless communications system 300 includes a 5G network. For example, base station 105 may be a 5G base station (e.g., configured to operate in accordance with a 5G standard). Additionally, UE 115 may include a 5G UE (e.g., a UE configured to operate in accordance with a 5G network).

During operation of wireless communications system 300, UE 115 and base station 105 may each generate one or more beams (from one or more antennas) for communicating with each other. For example, UE 115 may generate first RX beam 316 and second RX beam 318, and base station 105 may generate first TX beam 330, second TX beam 332, third TX beam 334, and fourth TX beam 336. Although 6 beams are described and illustrated, in other implementations, more or less than 4 TX beams and more or less than 2 RX beams may be generated. RX beams 316-318 and TX beams 330-336 may enable communication between UE 115 and base station 105. As a non-limiting example, UE 115 may attach to (e.g., associate with) base station 105 via second RX beam 318 and second TX beam 332 to enable wireless communications between UE 115 and base station 105. In other examples, UE 115 may associate with base station 105 via other TX and RX beams.

To associate with base station 105 in accordance with a first wireless connection standard (e.g., a 5G NR standard), UE 115 (e.g., first SIM 310) may perform search operation 340 on TX beams 330-336 and RX beams 316-318. Performing search operation 340 determines a subset of transmit beams that have the best quality. Performance of search operation 340 may include searching through each of the receive beams to scan each of the transmit beams. For example, performance of search operation 340 may include searching through each of RX beams 316-318 to scan each of TX beams 330-336. In a particular implementation, if there are R receive beams and T transmit beams, search operation 340 scans a total of R*T combinations of beams. In the example illustrated in FIG. 3, there are 2 receive beams and 4 transmit beams, and search operation 340 scans 8 combinations of beams. Searching the beams may include scanning each of TX beams 330-336 for a received signal received power (RSRP) and determining the M transmit beams (e.g., the subset of transmit beams) having the highest RSRP (or an RSRP that satisfies a threshold), where M is an integer less than T. For example, each transmit beam of the subset of transmit beams may satisfy a RSRP threshold. In other implementations, the subset of transmit beams (e.g., the M transmit beams) may be determined based on other metrics of signal quality.

After performing search operation 340, UE 115 (e.g., first SIM 310) performs measurement operations 342 on the subset of transmit beams (e.g., the M transmit beams) to determine the transmit beam (and corresponding receive beam) that is the best (e.g., that has the highest quality metric(s)). Performing measurement operations 342 may include measuring a RSRP for each of the subset of transmit beams, performing a physical broadcast channel (PBCH) cyclic redundancy check (CRC), or some other measurement on each transmit beam of the subset of transmit beams. Performing measurement operations 342 determines a particular transmit beam (and corresponding receive beam) from the subset of transmit beams. In some implementations, the particular transmit beam has a highest RSRP, a highest PBCH CRC, or both, of the subset of transmit beams. Because measurement operations 342 are performed on only the subset of transmit beams (e.g., the M transmit beams) instead of all the transmit and receive beams, performing measurement operations 342 is faster than performing search operation 340.

During, or after, performance of measurement operations 342, second SIM 312 may take control of the communication circuitry of UE 115 from first SIM 310. In such implementations, second SIM 312 has a higher priority than first SIM 310, or the operation performed by second SIM 312 has a higher priority than the operation performed by first SIM 310. For example, second SIM 312 may be scheduled to perform a particular operation (e.g., a paging operation or an out of service/acquisition operation). Second SIM 312 performing the particular operation may cause first SIM 310 to perform a tune away operation, which may interrupt the attempt by first SIM 310 to associate with base station 105. For example, search operation 340 and measurement operations 342 may be performed by first SIM 310 prior to performance of a tune away operation. Second SIM 312 may be in an idle state during search operation 340 and measurement operations 342. In contrast, first SIM 310 may be in an idle state during the particular operation (e.g., the paging operation or the out of service/acquisition operation)

of second SIM 312. Thus, first SIM 310 and second SIM 312 may share the communication circuitry of UE 115.

To reduce or prevent RLF after the end of the tune away period (e.g., after completion of the particular operation by second SIM 312), UE 115 may store indicators of the subset of transmit beams in database 314 (accessible to UE 115) in response to second SIM 312 performing the particular operation. For example, UE 115 may store indicators of the M best transmit beams (e.g., the subset of transmit beams) in database 314. Although illustrated as being included in memory 304, in other implementations, database 314 is external to and accessible to UE 115 (e.g., via a network, etc.). The indicators may be beam identifiers, such as a number or other identifier assigned to each of the transmit beams from base station 105. Additionally, first SIM 310 may refrain from performing measurement operations 342 on the subset of transmit beams in response to second SIM 312 performing the particular operation (e.g., the paging operation of the out of service/acquisition operation).

After completion of the particular operation by second SIM 312, second SIM 312 relinquishes control of the communication circuitry of UE 115 to first SIM 310. UE 115 (e.g., first SIM 310) performs measurement operations 342 on the subset of transmit beams to select a particular transmit beam of the subset of transmit beams and a corresponding receive beam for attachment to base station 105. For example, UE 115 may select the transmit beam having the highest RSRP, the highest PBCH CRC, or both, as the particular transmit beam. To determine the particular transmit beam, UE 115 may access database 314 based on completion of the paging operation to identify the subset of transmit beams, the UE 115 may perform measurement operation 342 on the subset of transmit beams identified from database 314.

Once the particular transmit beam (and the corresponding receive beam) is determined, the selected beams may be indicated to base station 105. For example, UE 115 may transmit a message 344 to base station 105. Message 344 may indicate the particular transmit beam selected by UE 115 and one or more metrics measured at UE 115. The one or more metrics may include a RSRP, channel state feedback, other signal metrics measured by UE 115, or a combination thereof. After transmitting message 344, UE 115 may associate with (e.g., attach to) base station 105 using the particular transmit beam and the particular receive beam. For example, if the particular transmit beam is first TX beam 330 and the particular receive beam is second RX beam 318, UE 115 may associate with base station 105 using first TX beam 330 and second RX beam 318. In other examples, UE 115 may associate with base station 105 using a different transmit beam and/or a different receive beam.

In some instances, UE 115 (e.g., first SIM 310) may fail to determine the particular transmit beam and the particular receive beam during performance of measurement operations 342. In such instances, UE 115 (e.g., first SIM 310) may perform a second search operation on the transmit beams and the receive beams to determine a second subset of transmit beams. The second search operation may be similar to search operation 340. Upon determining the second subset of transmit beams, UE 115 (e.g., first SIM 310) may perform second measurement operations on the second subset of beams to determine the particular transmit beam (and the corresponding particular receive beam). The second measurement operations may be similar to measurement operations 342. Thus, if measurement operations 342 fail to result in a determination of a particular transmit beam, UE 115 may perform a second round of search operation and measurement operations to determine the particular transmit beam.

Thus, FIG. 3 describes a wireless communications system 300 that enables storage of indicators of a subset of transmit beams prior to a tune away period by first SIM 310. Storing the indicators in database 314 enables UE 115 (e.g., first SIM 310) to access the indicators and perform measurement operations 342 on the subset of transmit beams after the tune away period is over. Performing measurement operations 342 is faster than performing a second cycle of search operation and measurement operations, which may reduce or eliminate RLF due to a degraded beam (e.g., a beam having a quality that degraded during the tune away period). Reducing or eliminating RLF improves the quality of a call and improves throughput in the wireless communications system 300. Battery power will also be conserved at UE 115 by eliminating a battery consuming search operation.

FIGS. 4A and 4B are diagrams of operations performed by a first SIM of an MSIM device. In some implementations, the operations described with reference to FIGS. 4A and 4B may be performed by first SIM 310 of FIG. 3.

FIG. 4A illustrates a first set of operations 400 performed by a first SIM of a conventional MSIM device. Operations 400 include a first NR data portion 402, a tune away gap 404, and a second NR data portion 406. During first NR data portion 402, the first SIM (e.g., a 5G NR SIM) may perform one or more operations using the communication circuitry of a UE, such as UE 115 of FIG. 3. During tune away gap 404, a second SIM, such as an LTE SIM or another type of SIM, takes control of the communication circuitry to perform one or more operations. As a particular example, the second SIM may perform a paging operation. Performance of the paging operation by the second SIM causes a tune away operation by the first SIM (e.g., the 5G NR SIM), and the first SIM may enter an idle state after tuning away. After performance of the paging operation by the second SIM, control of the communication circuitry is returned to the first SIM, and tune away gap 404 ends. Following tune away gap 404 is second NR data portion 406, during which the first SIM (e.g., the 5G NR SIM) may perform one or more operations using the communication circuitry of the UE.

During first NR data portion 402, the first SIM (e.g., the 5G NR SIM) performs operations to scan and measure transmit and receive beams from a base station, such as base station 105 of FIG. 3. For example, the first SIM may perform a search operation 410 to scan the receive beams and the transmit beams and to determine a subset of transmit beams (e.g., that satisfy a RSRP threshold or another quality threshold). Search operation 410 include or correspond to search operation 340 of FIG. 3. After performing search operation 410 and identifying the subset of transmit beams, the first SIM may perform measurement operations 412, 414, and 416 on the subset of transmit beams to determine a particular transmit beam that is the best transmit beam (e.g., that has the highest RSRP and/or another quality metric). Measurement operations 412-416 may include or correspond to measurement operations 342 of FIG. 3. As illustrated in FIG. 4A, measurement operations 412-416 are faster (e.g., take less time to perform) than search operation 410. The measurement operations may be interrupted by tune away gap 404.

During second NR data portion 406, the first SIM (e.g., the 5G NR SIM) performs operations to scan and measure transmit and receive beams from the base station in case the beams have degraded in quality during tune away gap 404. For example, the first SIM may perform search operation 418 after tune away gap 404 is complete. Search operation 418 may result in a determination of a subset of transmit beams. Next, the first SIM may perform measurement operation 420 on the subset of transmit beams to determine a particular transmit beam (and corresponding receive beam) for use in associating with the base station. After measurement operation 420 is complete, the UE may associate with the base station using the particular transmit beam and the particular receive beam. However, in some instances, if the current beam used to associate the UE with a base station degrades sufficiently during the tune away gap, the continued degradation of the beam may lead to RLF before search operation 418 and measurement operation 420 are complete. Thus, conventional MSIM devices may be prone to RLF in certain circumstances.

FIG. 4B illustrates a second set of operations 430 performed by a first SIM of a MSIM device in accordance with the present disclosure. Operations 430 include a first NR data portion 432, a tune away gap 434, and a second NR data portion 436. During first NR data portion 432, the first SIM (e.g., a 5G NR SIM) may perform one or more operations using the communication circuitry of a UE, such as UE 115 of FIG. 3. During tune away gap 434, a second SIM, such as an LTE SIM or another type of SIM with higher priority, takes control of the communication circuitry to perform one or more operations. As a particular example, the second SIM may perform a paging operation. Performance of the paging operation by the second SIM causes a tune away operation by the first SIM (e.g., the 5G NR SIM), and the first SIM may enter an idle state after tuning away. After performance of the paging operation by the second SIM, control of the communication circuitry is returned to the first SIM, and tune away gap 434 ends. Following tune away gap 434 is second NR data portion 436, during which the first SIM (e.g., the 5G NR SIM) may perform one or more operations using the communication circuitry of the UE.

During first NR data portion 432, the first SIM (e.g., the 5G NR SIM) performs operations to scan and measure transmit and receive beams from a base station, such as base station 105 of FIG. 3. For example, the first SIM may perform a search operation 440 to scan the receive beams and the transmit beams and to determine a subset of transmit beams (e.g., that satisfy a RSRP threshold or another quality threshold). Search operation 440 may include or correspond to search operation 340 of FIG. 3. After performing search operation 410 and identifying the subset of transmit beams, the first SIM may perform measurement operations 442, 444, and 446 on the subset of transmit beams to determine a particular transmit beam that is the best transmit beam (e.g., that has the highest RSRP and/or another quality metric). Measurement operations 442-446 may include or correspond to measurement operations 342 of FIG. 3. As illustrated in FIG. 4B, measurement operations 442-446 are faster (e.g., take less time to perform) than search operation 440. The measurement operations may be interrupted by tune away gap 434. However, unlike the example illustrated in FIG. 4A, in the example of FIG. 4B, indicators of the subset of transmit beams (e.g., the M best transmit beams) are stored 448 in a database prior to tune away gap 434. Storing 448 the indicators of the subset of transmit beams enables the subset of transmit beams to be quickly identified after tune away gap 434 is completed.

After tune away gap 434 is completed (e.g., during second NR data portion 436), the first SIM accesses the database to identify the subset of transmit beams, and the first SIM performs measurement operation 450 on the first set of transmit beams. Performing measurement operation 450 enables the first SIM to determine the best transmit beam (e.g., that has the highest RSRP and/or another quality metric). Additionally, in some implementations, the first SIM may perform a periodic search operation 452 to ensure that the proper transmit and receive beam are being used. As illustrated in FIGS. 4A and 4B, performing measurement operation 450 is faster (e.g., takes less time) than performing search operation 418 followed by measurement operation 420. Because of the improved speed, the first SIM may be able to detect the proper transmit beam and associate with the base station before a currently used beam degrades in quality enough to cause RLF. Thus, RLF may be reduced or prevented, thereby improving call quality and throughput throughout the wireless system.

Figure 5:
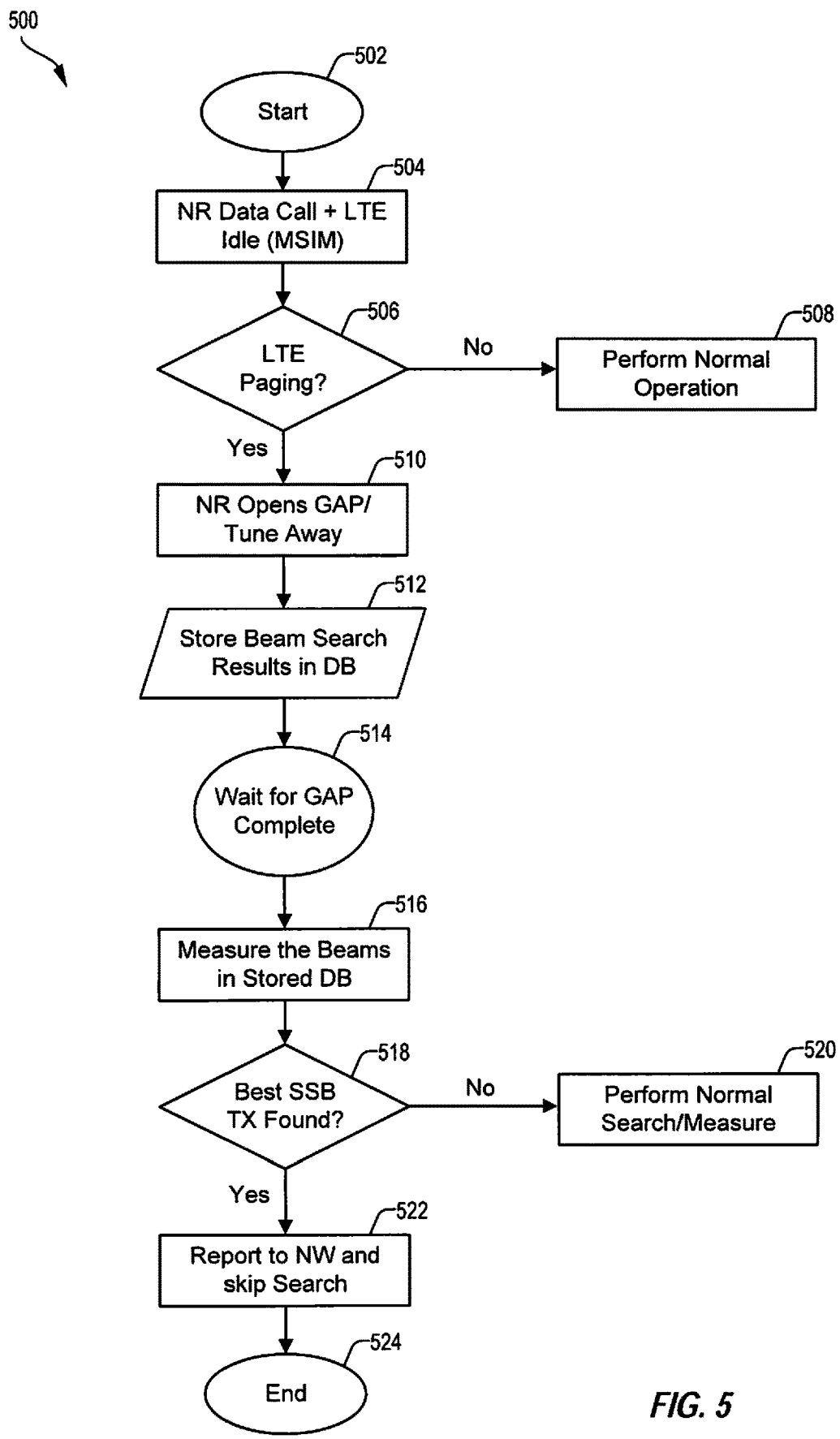
FIG. 5 is a block diagram illustrating example blocks of a method of storing indicators of a subset of transmit beams according to some aspects of the present disclosure.

FIG. 5 is a block diagram illustrating example blocks executed to implement a method 500 of storing indicators of a subset of transmit beams. In some implementations, the method 500 is performed by UE 115 of FIG. 3 or UE 115 of FIG. 7.

Method 500 starts at 502. Method 500 includes initiating a NR data call, at 504. The NR data call may be initiated by a first SIM, such as first SIM 310 of FIG. 3. During the NR data call, a second SIM (e.g., an LTE SIM) is idle. Although described as a NR SIM and an LTE SIM, in other implementations, the first SIM and the second SIM may correspond to any two wireless communication standards, which may be the same or different.

Method 500 proceeds to 506, where it is determined whether the LTE SIM is performing a paging operation (or an out of service/acquisition operation, as another non-limiting example). If the LTE SIM is not performing a paging operation (or other operation that requires use of the communication circuitry of the UE), method 500 proceeds to 508, and normal operations are performed by the NR SIM, such as performing searching operations and measurement operations to associate with a base station via a particular transmit beam and a particular receive beam.

If the LTE SIM is performing a paging operation (or other operation that requires use of the communication circuitry of the UE), method 500 proceeds to 510, and the NR SIM opens a gap/tunes away (e.g., performs a tune away operation). In addition, the NR SIM stores beam search results (e.g., indicators of a subset of transmit beams) in a database, at 512.

Method 500 then proceeds to 514, and the first SIM waits for the tune away gap to complete (e.g., for the second SIM to complete the paging operation and relinquish controls of the communication circuitry). During at least a part of the tune away gap, the first SIM may be in an idle state. Upon completion of the tune away gap (e.g., upon completion of the paging operation by the second SIM), the first SIM may access the database to identify the subset of transmit beams and perform measurement operations on the subset of transmit beams, at 516. Performing measurement operations on the subset of transmit beams may include measuring a RSRP, a PBCH CRC, another quality metric, or a combination thereof. Method 500 proceeds to 518, where it is determined whether the best transmit beam (e.g., synchronization signal block (SSB) TX) is found. If the best transmit beam is not found, method 500 proceeds to 520, and another normal search operation and measurement operation is performed. If the best transmit beam is found, method 500 proceeds to 522, and the transmit beam is reported to the network (e.g., to the base station) and a search is skipped. Method 500 then ends at 524.

Thus, method 500 enables storage of indicators of a subset of transmit beams determined during a first search operation.

Storing the indicators of the subset of transmit beams during the tune away period enables the first SIM to access the indicators to perform measurement operations on the subset of transmit beams when the tune away period is over, instead of performing a new cycle of search operations and measurement operations. This saves time and may reduce, or prevent, RLF at the UE, which improves call quality and increases throughput within the wireless communication system. Battery power at a UE will also be conserved by eliminating a battery-consuming search operation.

Figure 6:
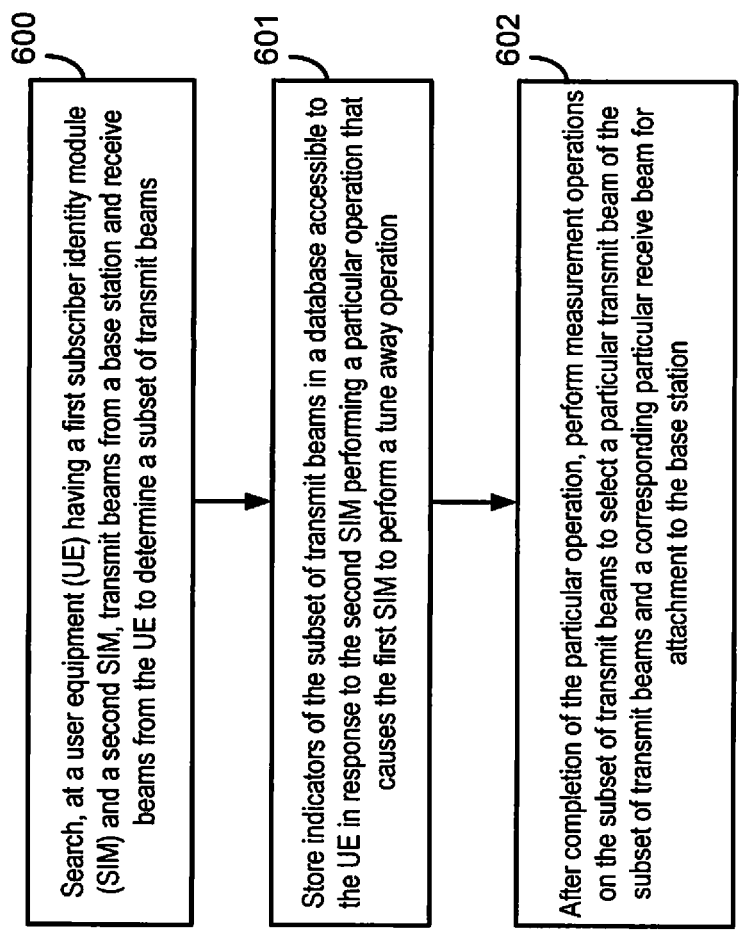
FIG. 6 is a block diagram illustrating example blocks of a method executed by a UE according to some aspects of the present disclosure.
Figure 7:
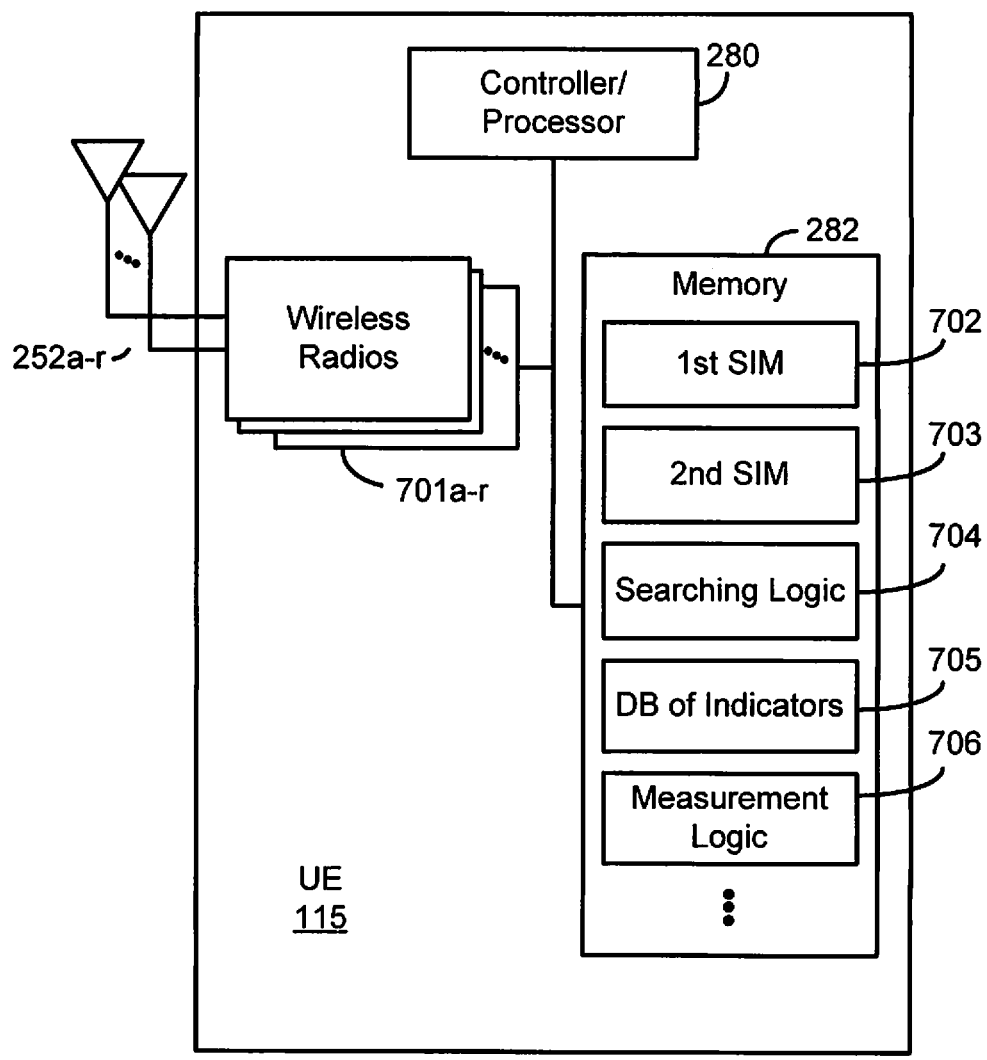
FIG. 7 is a block diagram conceptually illustrating a design of a UE configured to store beam indicators according to some aspects of the present disclosure.

FIG. 6 is a block diagram illustrating example blocks executed to implement one aspect of the present disclosure. The example blocks will also be described with respect to UE 115 as illustrated in FIG. 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r includes various components and hardware, as illustrated in FIG. 2 for UE 115, including modulator/demodulators 254a-r, MIMO detector 256, receive processor 258, transmit processor 264, and TX MIMO processor 266.

At block 600, the UE searches transmit beams from a base station and receive beams from the UE to determine a subset of transmit beams. The UE has a first SIM 702 and a second SIM 703. The UE 115 may execute, under control of controller/processor 280, searching logic 704 stored in memory 282. The execution environment of searching logic 704 provides the functionality to search transmit and receive beams to determine a subset of transmit beams. In a particular implementation, the subset of transmit beams are the M transmit beams having a highest RSRP, or an RSRP that satisfies a threshold.

At block 601, the UE stores indicators of the subset of transmit beams in a database accessible to the UE in response to the second SIM performing a particular operation (e.g., a paging operation or an out of service/acquisition operation) that causes the first SIM to perform a tune away operation. The UE 115, in response to second SIM 703 performing a particular operation may store indicators of the subset of transmit beams in database of indicators 705. Although illustrated as being included in memory 282, in other implementations, database of indicators 705 may be external to and accessible to UE 115.

At block 602, after completion of the particular operation, the UE performs measurement operations on the subset of transmit beams to select a particular transmit beam of the subset of transmit beams and a corresponding particular receive beam for attachment to the base station. The UE 115 may execute, under control of controller/processor 280, measurement logic 706 stored in memory 282. The execution environment of measurement logic 706 provides the functionality to perform measurement operations on the subset of transmit beams to select a particular transmit beam of the subset of transmit beams (stored in database of indicators 705) and a corresponding particular receive beam for attachment to a base station. In some implementations, the measurement operations may include received signal received power (RSRP) measurements or other types of measurements of signal strength or quality.

Use of stored indicators of a subset of transmit beams may include additional aspects, such as any single aspect or any combination of aspects described below and/or in connection with one or more other processes described elsewhere herein. In such aspects, a UE (including a first SIM and a second SIM) may search transmit beams from a base station and receive beams from the UE to determine a subset of transmit beams. The UE may store indicators of the subset of transmit beams in a database accessible to the UE in response to the second SIM performing a particular operation that causes the first SIM to perform a tune away operation. After completion of the particular operation, the UE may perform measurement operations on the subset of transmit beams to select a particular transmit beam of the subset of transmit beams and a corresponding particular receive beam for attachment to the base station.

In a first aspect, the particular operation includes a paging operation or an out of service/acquisition operation.

In a second aspect, alone or in combination with the first aspect, the first SIM corresponds to a first wireless communication standard, and the second SIM corresponds to a second wireless communication standard.

In a third aspect, alone or in combination with the second aspect, the first SIM includes a fifth generation (5G) new radio (NR) SIM, and the second SIM includes a 5G NR SIM, a Long-term evolution (LTE) SIM, a wideband code division multiple access (WCDMA) SIM, or a Global System for Mobile Communications (GSM) SIM.

In a fourth aspect, alone or in combination with one or more of the first through third aspects, the UE accesses the database based on completion of the particular operation to identify the subset of transmit beams.

In a fifth aspect, alone or in combination with one or more of the first through fourth aspects, the UE refrains from performing the measurement operations on the subset of transmit beams in response to the second SIM performing the particular operation.

In a sixth aspect, alone or in combination with one or more of the first through fifth aspects, searching the transmit beams and the receive beams includes searching through each of the receive beams to scan each of the transmit beams.

In a seventh aspect, alone or in combination with one or more of the first through sixth aspects, the UE transmits, from the UE to the base station, a message indicating the particular transmit beam.

In an eighth aspect, alone or in combination with the seventh aspect, the UE associates with the base station using the particular transmit beam and the particular receive beam and one or more metrics measured at the UE. The one or more metrics include a received signal received power (RSRP), channel state feedback, or a combination thereof.

In a ninth aspect, alone or in combination with one or more of the first through eighth aspects, the UE, in response to failing to determine the particular transmit beam and the particular receive beam during the measurement operations, performs a search operation on the transmit beams and the receive beams to determine a second subset of transmit beams.

In a tenth aspect, alone or in combination with the ninth aspect, the UE performs second measurement operations on the second subset of transmit beams to determine the particular transmit beam and the particular receive beam.

In an eleventh aspect, alone or in combination with one or more of the first through tenth aspects, each transmit beam of the subset of transmit beams satisfies a received signal received power (RSRP) threshold.

In a twelfth aspect, alone or in combination with one or more of the first through eleventh aspects, searching the transmit beams and the receive beams and performing the measurement operations are performed by the first SIM.

In a thirteenth aspect, alone or in combination with one or more of the first through twelfth aspects, the particular transmit beam has a highest received signal received power (RSRP), a highest physical broadcast channel (PBCH) cyclic redundancy check (CRC), or both, of the subset of transmit beams.

In a fourteenth aspect, alone or in combination with one or more of the first through thirteenth aspects, the second SIM is in an idle state during the searching and the performing the measurement operations.

In a fifteenth aspect, alone or in combination with one or more of the first through fourteenth aspects, the first SIM is in an idle state during the particular operation of the second SIM.

In a sixteenth aspect, alone or in combination with one or more of the first through fifteenth aspects, performing the measurement operations on the subset of transmit beams is faster than searching the transmit beams and the receive beams.

In a seventeenth aspect, alone or in combination with one or more of the first through sixteenth aspects, performing the measurement operations comprises measuring a received signal received power (RSRP) for each of the subset of transmit beams.

In an eighteenth aspect, alone or in combination with one or more of the first through seventeenth aspects, the second SIM has a higher priority than the first SIM.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-6 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, the method comprising:
    searching, at a user equipment (UE) having a first subscriber identity module (SIM) and a second SIM, transmit beams from a base station and receive beams from the UE to determine a subset of transmit beams that satisfies a threshold parameter;
    storing indicators of the subset of transmit beams in a database accessible to the UE in response to the second SIM performing a particular operation that causes the first SIM to perform a tune away operation; and
    after completion of the particular operation, performing measurement operations on the subset of transmit beams to select a particular transmit beam of the subset of transmit beams and a corresponding particular receive beam for attachment to the base station, wherein performing the measurement operations on the subset of transmit beams is faster than searching the transmit beams and the receive beams.

2. The method of claim 1, wherein the particular operation comprises a paging operation or an out of service/acquisition operation.

3. The method of claim 1, wherein the first SIM corresponds to a first wireless communication standard, and wherein the second SIM corresponds to a second wireless communication standard, and wherein the transmit beams and the receive beams are associated with the first SIM.

4. The method of claim 3, wherein the first SIM comprises a fifth generation (5G) new radio (NR) SIM, and wherein the second SIM comprises a 5G NR SIM, a Long-term evolution (LTE) SIM, a wideband code division multiple access (WCDMA) SIM, or a Global System for Mobile Communications (GSM) SIM.

5. The method of claim 1, further comprising accessing the database based on completion of the particular operation to identify the subset of transmit beams.

6. The method of claim 1, further comprising refraining from performing the measurement operations on the subset of transmit beams in response to the second SIM performing the particular operation.

7. The method of claim 1, wherein searching the transmit beams and the receive beams comprises searching through each of the receive beams to scan each of the transmit beams.

8. The method of claim 1, further comprising transmitting, from the UE to the base station, a message indicating the particular transmit beam and one or more metrics measured at the UE, wherein the one or more metrics comprise a received signal received power (RSRP), channel state feedback, or a combination thereof.

9. The method of claim 8, further comprising associating, at the UE, with the base station using the particular transmit beam and the particular receive beam.

10. The method of claim 1, further comprising, in response to failing to determine the particular transmit beam and the particular receive beam during the measurement operations, performing a second search operation on the transmit beams and the receive beams to determine a second subset of transmit beams.

11. The method of claim 10, further comprising performing second measurement operations on the second subset of transmit beams to determine the particular transmit beam and the particular receive beam.

12. The method of claim 1, wherein the indicators of the subset of transmit beams are stored in the database prior to performing the tune away operation and prior to performing the measurement operations on the subset of transmit beams to select the particular transmit beam and the corresponding particular receive beam.

13. An apparatus for wireless communication, the apparatus comprising:
    at least one processor; and
    a memory coupled to the at least one processor, wherein the at least one processor is configured to:
        search, at a user equipment (UE) having a first subscriber identity module (SIM) and a second SIM, transmit beams from a base station and receive beams from the UE to determine a subset of transmit beams that satisfies a threshold parameter;
        store indicators of the subset of transmit beams in a database accessible to the UE in response to the second SIM performing a particular operation that causes the first SIM to perform a tune away operation; and
        after completion of the particular operation, perform measurement operations on the subset of transmit beams to select a particular transmit beam of the subset of transmit beams and a corresponding particular receive beam for attachment to the base station, wherein performing the measurement operations on the subset of transmit beams is faster than searching the transmit beams and the receive beams.

14. The apparatus of claim 13, wherein each transmit beam of the subset of transmit beams satisfies a received signal received power (RSRP) threshold.

15. The apparatus of claim 13, wherein searching the transmit beams and the receive beams and performing the measurement operations are performed by the first SIM.

16. The apparatus of claim 13, wherein the particular transmit beam has a highest received signal received power (RSRP), a highest physical broadcast channel (PBCH) cyclic redundancy check (CRC), or both, of the subset of transmit beams.

17. The apparatus of claim 13, wherein the second SIM is in an idle state during the searching and the performing measurement operations.

18. The apparatus of claim 13, wherein the first SIM is in an idle state during the particular operation of the second SIM.

19. The apparatus of claim 13, wherein performing the measurement operations comprises measuring a received signal received power (RSRP) for each of the subset of transmit beams.

20. The apparatus of claim 13, wherein the particular operation comprises a paging operation or an out of service/acquisition operation.

21. An apparatus for wireless communication, the apparatus comprising:
    means for searching, at a user equipment (UE) having a first subscriber identity module (SIM) and a second SIM, transmit beams from a base station and receive beams from the UE to determine a subset of transmit beams that satisfies a threshold parameter;
    means for storing indicators of the subset of transmit beams in a database accessible to the UE in response to the second SIM performing a particular operation that causes the first SIM to perform a tune away operation; and
    means for, after completion of the particular operation, performing measurement operations on the subset of transmit beams to select a particular transmit beam of the subset of transmit beams and a corresponding particular receive beam for attachment to the base station, wherein performing the measurement operations on the subset of transmit beams is faster than searching the transmit beams and the receive beams.

22. The apparatus of claim 21, wherein the first SIM corresponds to a first wireless communication standard, and wherein the second SIM corresponds to a second wireless communication standard, and wherein the transmit beams and the receive beams are associated with the first SIM.

23. The apparatus of claim 22, wherein the first SIM comprises a fifth generation (5G) new radio (NR) SIM, and wherein the second SIM comprises a 5G NR SIM, a Long-term evolution (LTE) SIM, a wideband code division multiple access (WCDMA) SIM, or a Global System for Mobile Communications (GSM) SIM.

24. The apparatus of claim 21, wherein the second SIM is in an idle state during the searching and the performing the measurement operations.

25. The apparatus of claim 21, wherein the first SIM is in an idle state during the particular operation of the second SIM.

26. A non-transitory computer readable medium storing instructions that, when executed by a processor, cause the processor to perform operations comprising:
    searching, at a user equipment (UE) having a first subscriber identity module (SIM) and a second SIM, transmit beams from a base station and receive beams from the UE to determine a subset of transmit beams that satisfies a threshold parameter;
    storing indicators of the subset of transmit beams in a database accessible to the UE in response to the second SIM performing a particular operation that causes the first SIM to perform a tune away operation; and
    after completion of the particular operation, performing measurement operations on the subset of transmit beams to select a particular transmit beam of the subset of transmit beams and a corresponding particular receive beam for attachment to the base station, wherein performing the measurement operations on the subset of transmit beams is faster than searching the transmit beams and the receive beams.

27. The non-transitory computer readable medium of claim 26, wherein the operations further comprise accessing the database based on completion of the particular operation to identify the subset of transmit beams.

28. The non-transitory computer readable medium of claim 26, wherein performing the measurement operations comprises measuring a received signal received power (RSRP) of each of the subset of transmit beams.

29. The non-transitory computer readable medium of claim 26, wherein searching the transmit beams and the receive beams comprises searching through each of the receive beams to scan each of the transmit beams.

30. The non-transitory computer readable medium of claim 26, wherein the operations further comprise initiating transmission, from the UE to the base station, of a message indicating the particular transmit beam and one or more metrics measured at the UE, and wherein the one or more metrics comprise a received signal received power (RSRP), channel state feedback, or a combination thereof.

* * * * *